(12) United States Patent
Hasz et al.

(10) Patent No.: US 6,827,254 B2
(45) Date of Patent: Dec. 7, 2004

(54) TURBINE ENGINE COMPONENT HAVING WEAR COATING AND METHOD FOR COATING A TURBINE ENGINE COMPONENT

(75) Inventors: Wayne Charles Hasz, Pownal, VT (US); David Edwin Budinger, Loveland, OH (US)

(73) Assignee: General Electric Company, Niskayuna, NY (US)

( * ) Notice: Subject to any disclaimer, the term of this patent is extended or adjusted under 35 U.S.C. 154(b) by 131 days.

(21) Appl. No.: 10/178,848

(22) Filed: Jun. 25, 2002

(65) Prior Publication Data

US 2002/0189722 A1 Dec. 19, 2002

Related U.S. Application Data

(62) Division of application No. 09/343,988, filed on Jun. 29, 1999, now Pat. No. 6,451,454.

(51) Int. Cl.[7] ........................ B23K 31/02; B23K 35/02
(52) U.S. Cl. ..................................... 228/246; 228/256
(58) Field of Search ............................... 228/245–262, 228/119; 29/889.1, 889–889.722

(56) References Cited

U.S. PATENT DOCUMENTS

| | | | |
|---|---|---|---|
| 3,960,552 A | | 6/1976 | Woulds |
| 3,971,633 A | * | 7/1976 | Wolfla et al. ............... 428/552 |
| 4,003,765 A | | 1/1977 | Davidson |
| 4,064,608 A | | 12/1977 | Jaeger |
| 4,118,254 A | | 10/1978 | Knotek et al. |
| 4,162,392 A | | 7/1979 | Brown et al. |
| 4,249,913 A | * | 2/1981 | Johnson et al. ............... 51/295 |
| 4,275,124 A | | 6/1981 | McComas et al. |
| 4,404,049 A | | 9/1983 | Tanaka et al. |
| 4,566,700 A | * | 1/1986 | Shiembob ................... 277/415 |
| 4,606,948 A | * | 8/1986 | Hajmrle et al. ............... 427/451 |
| 4,610,698 A | | 9/1986 | Eaton et al. |
| 4,666,733 A | * | 5/1987 | Wlodek ....................... 427/451 |
| 4,689,242 A | | 8/1987 | Pike |
| 4,802,828 A | * | 2/1989 | Rutz et al. ............... 416/241 B |
| 4,851,188 A | | 7/1989 | Schaefer et al. |
| 4,874,290 A | | 10/1989 | Cang et al. |
| 4,878,953 A | * | 11/1989 | Saltzman et al. ............ 148/512 |
| 4,931,152 A | | 6/1990 | Naik et al. |
| 4,999,255 A | | 3/1991 | Jackson et al. |
| 5,079,100 A | | 1/1992 | Descamp et al. |
| 5,104,293 A | | 4/1992 | Eaton et al. |
| 5,137,422 A | * | 8/1992 | Price et al. .................. 415/200 |
| 5,156,321 A | * | 10/1992 | Liburdi et al. ............... 228/119 |
| 5,185,924 A | * | 2/1993 | Fraser ....................... 29/889.1 |

(List continued on next page.)

OTHER PUBLICATIONS

Conforma Clad ® Inc., Coating Product Information, downloaded from internet, Sep. 24, 1998; 2 pages.
Conforma Clad ®Inc., Coating Product Information, Date Unknown, 23 pages.
Wesgo Metals ( A Division of Wesgo Inc.) "Aircraft Engine Repair Materials", Date Unknown, 2 pages.
Materials Resources International, BrazeCoat ® Product Literature, Copyright 1996, 12 pages.
Materials Resoures International, "BrazeCoat ® Infiltrated Bonded Carbide Coatings For Superior Wear Protection", downloaded from internet Jun. 28, 1999, date of publication unknown, 6 pages.

Primary Examiner—Kiley Stoner
Assistant Examiner—Kevin L McHenry
(74) Attorney, Agent, or Firm—Paul J. DiConza; Patrick K. Patnode

(57) ABSTRACT

A turbine engine component includes a substrate and a wear coating on the substrate. The wear coating includes wear-resistant particles in a matrix phase, the wear-resistant particles being formed of chrome carbide or a cobalt alloy. Methods for forming a turbine engine component are also disclosed.

27 Claims, 1 Drawing Sheet

U.S. PATENT DOCUMENTS

| | | | |
|---|---|---|---|
| 5,240,491 A | * 8/1993 | Budinger et al. | 75/255 |
| 5,346,119 A | * 9/1994 | Koschlig et al. | 228/248.1 |
| 5,359,770 A | * 11/1994 | Brown et al. | 29/889.1 |
| 5,366,136 A | * 11/1994 | Pagnon | 228/119 |
| 5,458,460 A | 10/1995 | Okada et al. | |
| 5,549,767 A | * 8/1996 | Pietruska et al. | 148/512 |
| 5,652,028 A | * 7/1997 | Taylor et al. | 427/451 |
| 5,705,231 A | 1/1998 | Nissley et al. | |
| 5,747,163 A | 5/1998 | Douglas | |
| 5,819,774 A | 10/1998 | Beardsley et al. | |
| 6,541,075 B2 | * 4/2003 | Hasz et al. | 427/454 |

* cited by examiner

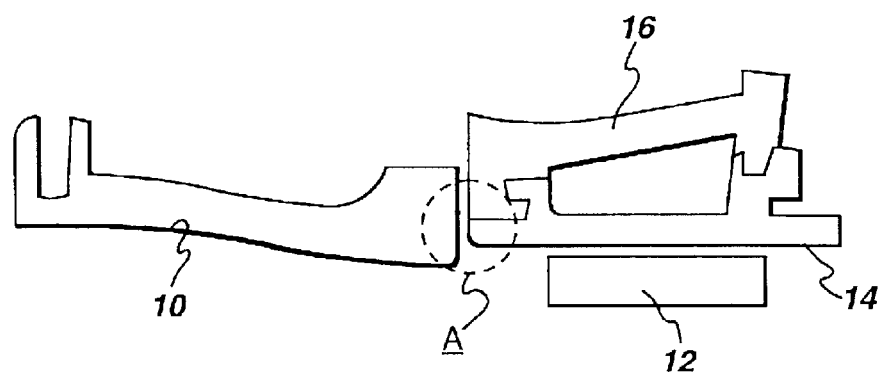

TURBINE ENGINE COMPONENT HAVING WEAR COATING AND METHOD FOR COATING A TURBINE ENGINE COMPONENT

This application is a division of application Ser. No. 09/343,988, filed Jun. 29, 1999 now U.S. Pat. No. 6,451,454, which is hereby incorporated by reference in its entirety.

BACKGROUND OF THE INVENTION

The present invention generally relates to coatings for turbine engine components, particularly, wear coatings for turbine engine components.

Wear coatings have found various applications in turbine engines. For example, abrasive, wear-resistant coatings are deposited on the outer tips of turbine blades. Such coatings are generally employed to decrease the rate of wear of the blade due to contact of the blade with its surrounding shroud. Other wear coatings are placed on leading edges of turbine blades to decrease wear (by erosion) due to contact with environmental particulates (e.g., dirt, sand) that enter the turbine engine during operation.

Still another type of wear coating is placed on parts of the turbine engine that are susceptible to wear due to part-to-part contact during operation. For example, in the high pressure turbine (HPT) and low pressure turbine (LPT) sections of an engine, wear coatings are placed on nozzle wear pads that rub against an adjacent structure, such as a shroud hanger or a pressure balance seal.

In the latter form of wear coating, to address part-to-part contact and wear, the coating is generally applied by a thermal spray process, such as plasma spraying. Several disadvantages exist with thermal spray processing. For example, the part to be treated must be masked in order to prevent application of the wear coating on portions of the component that are not subject to part-to-part wear. In addition, some regions of a part are difficult to access with thermal spray equipment. Also, the coating application requires time consuming processing.

Accordingly, a need exists in the art for improved techniques for depositing wear coatings. In addition, a need exists in the art for wear coatings that are resistant to spallation and which have requisite wear resistance.

SUMMARY OF THE INVENTION

According to an embodiment of the present invention, a turbine engine component includes a substrate, and a wear coating on the substrate, the wear coating including wear-resistant particles in a matrix phase, the wear-resistant particles being formed of a chrome carbide or a cobalt alloy.

Embodiments of the present invention also include methods for coating a substrate, such as a turbine engine component. In one method a preform is attached to the substrate, the preform containing braze alloy and wear-resistant particles. The preform is then heated and fused to the substrate to form the wear-resistant coating.

BRIEF DESCRIPTION OF THE DRAWINGS

The FIGURE illustrates a partial cross-section of components of a turbine engine.

DETAILED DESCRIPTION OF THE INVENTION

According to an embodiment of the present invention, a substrate, such as in the form of a turbine engine component, is treated to improve its erosion resistance at elevated operating temperatures, such as temperatures above 1200° F. The substrate is typically formed of a high-temperature alloy, including superalloy materials, known for high temperature performance in terms of tensile strength, creep resistance, oxidation resistance, and corrosion resistance, for example. Other high-temperature alloys may also be treated according to embodiments of the present invention, such as ferritic based alloys used in lower temperature environments, including the low-pressure stage of a turbine engine.

In the case of a superalloy material, the superalloy is typically formed of a nickel-base or a cobalt-base alloy, wherein nickel or cobalt is the single greatest element in the superalloy by weight. Illustrative nickel-base superalloys include at least about 40 wt % Ni, and at least one component from the group consisting of cobalt, chromium, aluminum, tungsten, molybdenum, titanium, and iron. Examples of nickel-base superalloys are designated by the trade names Inconel®, Nimonic®, Rene® (e.g., Rene®80-, Rene®95, Rene®142, and Rene®N5 alloys), and Udimet®, and include directionally solidified and single crystal superalloys. Illustrative cobalt-base superalloys include at least about 30 wt % Co, and at least one component from the group consisting of nickel, chromium, aluminum, tungsten, molybdenum, titanium, and iron. Examples of cobalt-base superalloys are designated by the trade names Haynes®, Nozzaloy®, Stellite® and Ultimet®. Typically the substrate is in the form of a turbine nozzle, shroud, shroud hanger, pressure balance seal, or combustor component. Such turbine components are generally subject to part-to-part wear due to abutting contact with each other or with other components of the turbine engine.

The FIGURE illustrates in partial cross-section components of a turbine engine that are treated with a wear coating according to an aspect of the present invention. It is noted that the operating principles and general structure of turbine engines are well known in the art and are not repeated herein. As illustrated, the partial cross-section of the turbine engine includes a nozzle 10 for directing fluid flow into the engine to drive blade 12. While the drawing depicts a single blade, the engine typically has a plurality of blades mounted on a rotational shaft. The blades rotate within an area defined by the shroud 14, which is supported by shroud hanger 16. Generally the shroud 14 and the shroud hanger 16 are in interlocking engagement such that the shroud is fully supported.

Area A represents a particular region for application of a wear coating according to an aspect of the present invention. The wear coating prevents unwanted wear due to abutting contact and relative movement between the nozzle 10, shroud 14 and shroud hanger 16. The wear coating can be applied on any one of or any combination of nozzle 10, shroud 14, and shroud hanger 16.

According to an embodiment of the present invention, the wear coating includes a first phase formed of wear material, and a second, matrix phase formed of braze alloy that bonds the wear material to the substrate. According to a particular embodiment of the present invention, the wear material is in particulate form and comprises a material from a group consisting of chrome carbide and cobalt alloys. The particular details of the wear coating are described hereinbelow.

The wear coating may be formed on the substrate according to various techniques. In one embodiment of the invention, the wear coating is deposited by placing a brazing sheet on the substrate and fusing the brazing sheet to the substrate. The brazing sheet is generally formed of a single green (unsintered) braze tape, several green tapes, or a braze preform.

The brazing sheet contains a braze alloy that is typically nickel-based or cobalt-based, wherein nickel or cobalt is the single greatest element of the braze alloy by weight. The braze alloy composition typically contains one or more components for lowering the melting point of the braze alloy for ease of fabrication (lower working temperature) and to ensure that the braze alloy melts in a temperature range lower than that of any underlying material as well as the wear material. Melting point suppressants for nickel-base and cobalt-base braze alloys include silicon, boron, phosphorous, or combinations thereof. Exemplary nickel-base braze alloy compositions include the following. The following components are designated in weight %:

| 1. | 4.5 Si, 14.5 Cr, 3.3 B, and 4.5 Fe, balance Ni; |
|---|---|
| 2. | 15 Cr, 3.5 B, balance Ni; |
| 3. | 4.5 Si, 3 B, balance Ni; |
| 4. | 4.2 Si, 7 Cr, 3 B, 3 Fe, balance Ni; |
| 5. | 10 Si, 19 Cr, balance Ni; |
| 6. | 3.5 Si, 22 Co, 2.8 B, balance Ni; |
| 7. | 3.5 Si, 1.8 B, balance Ni; |
| 8. | 4.5 Si, 14 Cr, 3 B, 4.5 Fe, balance Ni; |
| 9. | 17 Cr, 9 Si, 0.1 B, balance Ni; |
| 10. | 2.6 Si, 2 Cr, 2 B, 1 Fe, balance Ni; |
| 11. | 15 Cr, 8 Si, balance Ni; |
| 12. | 7 Cr, 3 Fe, 4 Si, 3 B, and balance Ni. |

Exemplary cobalt-base braze alloy compositions include:

| 1. | 8 Si, 19 Cr, 17 Ni, 4 W, 0.8 B, balance Co; |
|---|---|
| 2. | 17.0 Ni, 1.0 Fe, 8.0 Si, 19.0 Cr, 0.8 B, 0.4 C, balance Co; |
| 3. | 23.5 Cr, 10 Ni, 7 W, 3.5 Ta, 2.9 B, 0.2 Ti, balance Co; |
| 4. | 22 Cr, 22 Ni, 14.5 W, 0.35 Si, 2.3 B, balance Co. |

In one embodiment, the brazing sheet is a single layer, a green braze tape formed by drying a slurry containing a liquid medium such as water, organic solvent, or a mixture thereof, a braze alloy, wear material, and a binder. Examples of binders include water-base organic materials such as polyethylene oxide and various acrylics, as well as solvent-base binders. The slurry is typically tape cast onto a removable support sheet, such as a plastic sheet. The slurry is then dried, wherein the liquid medium including any volatile material therein is evaporated. The resulting green braze tape typically has a thickness in a range of about 75 microns to 2500 microns, preferably in a range of about 375 microns to about 1000 microns. Alternatively, the slurry can be cast directly onto the substrate, for producing an in-situ wear coating.

Alternatively, the brazing sheet is formed from multiple green tapes, generally including a first green tape containing braze alloy, and a second green tape containing wear material. This particular embodiment is advantageous in that it permits use of commercially available green braze tapes, generally containing as nickel-base or cobalt-base braze alloys, and that it minimizes in-plane shrinkage upon brazing to the substrate. Examples of commercially available green braze tapes include the Amdry line of braze tapes, available from Sulzer Metco.

In another embodiment, the brazing sheet containing braze alloy is in the form of a braze preform, which is similar to the single green braze tape mentioned above, but which contains no binder. The braze preform is generally formed by sintering a green braze tape (described above) to effect binder burn-out and densify the material to form a sintered preform. Alternatively, the braze preform is formed by one of various techniques, including melt spinning or thermal spray. The braze preform typically has a thickness on the order of about 200 microns to about 3000 microns, such as about 600 microns to about 2500 microns.

In one embodiment, the wear material is comprised of a ceramic wear-resistant powder. In one example, the wear-resistant powder comprises a carbide, particularly a chrome carbide. The chrome carbide is typically a material selected from the group consisting of $Cr_{23}C_6$, $Cr_7C_3$, $Cr_3C_2$, and combinations thereof. The chrome carbide is generally in the form of a pre-alloyed carbide powder, wherein the particles of the powder are homogeneous and uniform throughout their cross sections. Alternatively, the chrome carbide, such as $Cr_3C_2$, is blended with another material, such as NiCr which functions as a metallic binder.

In another embodiment, the particulate material is comprised of an alloy wear material. In this case, it is advantageous to utilize an alloy that forms a lubricious oxide film over its surface during actual use, which oxide functions to lubricate the interface between the treated component and adjacent structure at high temperatures (e.g., above 1000° F.) to reduce wear. For example, wear is reduced between a nozzle wear pad and an adjacent balance seal in a high pressure turbine due to presence of the oxide forming alloy. One particular group of materials that forms a lubricating or lubricious oxide film includes cobalt alloys. Exemplary cobalt-base lubricious alloys have the following nominal compositions:

(1) 28.5 wt % molybdenum, 17.5 wt % chromium, 3.4 wt % silicon, balance cobalt, (2) 22.0 wt % nickel, 22 wt % Cr, 14.5 wt % tungsten, 0.35 wt % silicon, 2.3 wt % boron, balance cobalt, (3) 10 wt % nickel, 20 wt % Cr, 15 wt % tungsten, balance cobalt, (4) 22 wt % nickel, 22 wt % Cr, 15.5 wt % tungsten, balance cobalt, and (5) 5 wt % nickel, 28 wt % Cr, 19.5 wt % tungsten, balance cobalt.

The particle size distribution of the wear-resistant particles typically lies within a range of about 5 to 200 microns, such as 10 to 45 microns (−325 mesh powder). The particulate phase 14 generally has a higher melting or softening point than that of the braze alloy such that the particles remain largely intact through the fusing operation. The proportion of wear-resistant particles to braze alloy is generally within a range of about 50 to about 95 wt %.

Following formation of a brazing sheet including a braze alloy component and a wear-resistant particulate phase component, the brazing sheet is applied to the substrate 10. The brazing sheet is typically attached to the substrate 10 by simple means prior to fusing. For example, in the case of a green braze tape or tapes, an adhesive is typically applied between the brazing sheet and substrate 10. Suitable adhesives completely volatilize during the fusing step. Illustrative examples of adhesives include polyethylene oxide and acrylic materials. A particular commercial example includes "4B Braze Binder" from Cotronics Corp. The adhesive may be applied utilizing one of various techniques including spraying or coating using a liquid adhesive, or applying a mat or film of double-sided adhesive tape.

Alternatively, in the case of a green tape or tapes, the sheet is exposed to a solvent that partially dissolves and plasticizes the binder, causing the tape to conform and adhere to the substrate surface. Examples of solvents include toluene, acetone, or another organic solvent that can be sprayed or brushed onto the green braze tape after placing the tape on the substrate.

In the case of a braze preform, the brazing sheet is typically spot welded to the substrate, such as by resistance welding. Other welding techniques include RF (radio-frequency) welding, and gas welding, such as TIG (tungsten inert gas) welding, and oxy-acetylene welding.

The fusing of the wear coating to the substrate is typically carried out in connection with a heat treatment cycle during new part manufacture or part repair or maintenance. In the latter case, fusing of the wear coating can be executed simultaneously with other brazing processes, such as braze repair of substrate cracks.

The brazing sheet containing the braze alloy component and the particulate phase component is then fused to the substrate. Generally, the fusing step is carried out by brazing, wherein the braze alloy melts, without any substantial attendant melting of substrate or the wear-resistant particles. The brazing temperature is largely dependent upon the type of braze alloy used, but is typically in a range of about 525° C. to about 1650° C. In the case of nickel-base braze alloys, braze temperatures are typically in the range of about 800° C. to about 1260° C. Because the braze alloy generally has a lower melting point than that of the wear-resistant particles, the braze alloy preferentially melts during fusing leaving the particles substantially intact, although minor reaction and dissolution of the wear powder and substrate may occur.

In the case of multiple green tapes, generally a green tape containing the braze alloy is stacked onto on a green tape containing the wear-resistant material, and the stacked tapes are placed on the substrate. Brazing is then carried out by heating the substrate, whereby the molten braze alloy infiltrates the wear-resistant material through capillary action and gravity, thereby bonding the wear resistant material to the substrate. By incorporating multiple green tapes in such a fashion, in-plane shrinkage of the wear coating is minimized as compared to a single green tape, thereby effectively preventing cracking of the wear coating and delamination of the wear coating from the substrate.

In one embodiment, brazing is carried out in a furnace having a controlled environment, such as a vacuum or an inert atmosphere. Fusing in a controlled environment advantageously prevents oxidation of the braze alloy and underlying materials including the substrate during heating, and allows precise control of part temperature and temperature uniformity. In the case of a vacuum furnace, the vacuum is typically in a range of about $10^{-1}$ Torr to about $10^{-8}$ Torr achieved by evacuating ambient air from the vacuum chamber of the furnace. In one particular embodiment, brazing is carried out at a pressure of about $5 \times 10^{-4}$ Torr. In the case of large substrates that are difficult to place in a furnace, or in-situ repairs on the engine, a torch or other localized heating means is typically used to effect brazing. Exemplary heating means include gas welding torches (e.g., oxy-acetylene, oxy-hydrogen, air-acetylene, and air-hydrogen), RF (radio frequency) welding, TIG (tungsten inert gas) welding, electron-beam welding, resistance welding, and use of IR (infra-red) lamps. In connection with such heating means, a flux or inert cover gas may be implemented, particularly for braze compositions that are free of boron.

Following heating so as to fuse the brazing sheet to the substrate, the braze alloy is permitted to cool, forming a metallurgical bond to the underlying material and mechanically retaining the wear-resistant particles within the solidified braze alloy forming a matrix phase. In some cases, during brazing and in subsequent elevated temperature exposures, the melting point suppressants are diffused out of the braze alloy such that the melting point of the final matrix phase is higher than the initial melting point, thereby yielding enhanced high temperature capability as required by the operating parameters of the turbine engine.

In the final structure, the braze alloy generally forms a film that is a continuous matrix phase. As used herein, "continuous" matrix phase denotes an uninterrupted film along the treated region of the substrate, between particles of the particulate phase. The thickness of the wear coating is typically chosen to ensure adequate protection of the treated substrate. By way of example, the thickness of braze alloy is typically less than about 100 mils, desirably less than 500 mils.

Following heating, a diffusion coating step is generally effected to aluminide the substrate. Generally, aluminiding is carried out to improve the oxidation and corrosion resistance of the treated component, to improve durability and longevity of the component. Diffusion coating is typically carried out by the known pack cementation process, or by a vapor phase technique. In this regard, typically the area of the substrate treated with the wear coating is does not need to be aluminided, and this portion of the aluminide layer may be removed, such as by subsequent dimensional grinding. However, according to an aspect of invention, the wear coating is adapted to withstand the aluminiding treatment, particularly, withstand the elevated temperature and aggressive chemistry of the aluminiding process. The braze alloy compositions 2, 5, and 12 listed above have been shown to withstand such processing.

In one particular variation of an embodiment of the invention, the brazing sheet is first deposited on the substrate, followed by diffusion coating. The fusing of the brazing sheet to form the wear coating is advantageously carried out contemporaneously with the diffusion coating, since the diffusion coating is deposited at an elevated temperature and will effect brazing of the wear-resistant particles to the substrate.

EXAMPLES

The following examples are merely illustrative, and should not be construed to be any sort of limitation on the scope of the claimed invention. All constituents are provided in weight percent unless otherwise indicated.

Example 1

A slurry was mixed which contained 50 g Praxair CrC-107 ($Cr_3C_2$), 50 g nickel-based braze alloy (19 Cr, 10 Si, balance Ni), 10 g PEO solution and 10 g DI water and tape cast to produce a 0.050" thick green tape. The green tape was applied to a Hast-X substrate using Nicrobraze 4B binder. This sample was then brazed for 20 min at 2215° F. which fused the tape to the underlying substrate. Metallography indicated that there was insufficient braze to completely densify the coating Example 2

A slurry was mixed which contained 50 g Praxair CrC-107 (Cr3C2), 5 g PEO solution and 5 g DI water and tape cast to produce a 0.050" thick green CrC tape. This green CrC tape was combined with a commercial 0.010" Amdryl 100 braze tape to form a green bilayer tape. This green bilayer tape was then applied to a Hast-X substrate using Nicrobraze 4B binder such that the stacking sequence was Hast-X substrate—green CrC tape—GE81 tape. This sample was then brazed for 20 min at 2215° F., which fused the tape to the underlying substrate. Metallography indicated that there was sufficient braze to infiltrate the CrC tape and completely densify the coating.

Example 3

The tape from example 1 was sintered for 20 min at 2215° F. to produce a preform. The resulting sintered preform was spot welded to a Hast-X substrate and brazed for 20 min at 2215° F. Metallography indicated that there was sufficient braze to completely densify the coating.

According to embodiments of the present invention, an improved wear coating and process for coating are provided. The wear coating is easily deposited in difficult to access regions of the substrate, without the need for masking. In the context of repairing and maintaining turbine engines, the coating may deposited on-site with minimal equipment.

Various embodiments of the invention have been described herein. However, this disclosure should not be deemed to be a limitation on the scope of the claimed invention. Accordingly, various modifications, adaptations, and alternatives may occur to one skilled in the art without departing from the scope of the present claims.

What is claimed is:

1. A method for coating a substrate, comprising the steps of:
    providing a substrate;
    applying braze alloy and wear-resistant particles on the substrate, the wear-resistant particles comprising a cobalt alloy; wherein the braze alloy and wear-resistant particles are applied to the substrate in the form of a brazing sheet, said brazing sheet comprising at least one green braze tape; and
    heating the braze alloy to bond the wear-resistant particles to the substrate to form a wear coating on the substrate.

2. The method of claim 1, wherein the braze alloy comprises a nickel-base or a cobalt-base braze alloy, nickel or cobalt being the single greatest element of the braze alloy by weight.

3. The method of claim 1, the substrate comprises a superalloy.

4. The method of claim 3, wherein the substrate comprises a nickel-base or a cobalt-base superalloy, wherein nickel or cobalt is the single greatest element of the superalloy by weight.

5. The method of claim 1, wherein the substrate is a turbine engine component selected from the group consisting of a nozzle, shroud, shroud hanger, pressure balance seal, or combustor component.

6. The method of claim 1, further comprising a step of applying a diffusion coating on the substrate.

7. The method of claim 6, wherein the diffusion coating is formed by depositing aluminum on the wear coating and heating the substrate, whereby the aluminum is diffused into the substrate and forms aluminide intermetallics.

8. The method of claim 1, wherein the brazing sheet comprises a single green braze tape.

9. The method of claim 1, wherein the brazing sheet comprises a first green tape containing the wear-resistant particles and a second green tape containing the braze alloy, the second green tape being stacked on the first green tape and applied to the substrate such that the braze alloy infiltrates the wear-resistant particles during the step of heating.

10. The method of claim 1, wherein the step of heating is carried out at a temperature of about 525 to about 1650° C.

11. A method for coating a substrate, comprising the steps of:
    providing a substrate;
    attaching a preform to the substrate, the preform containing braze alloy and wear-resistant particles and being free of binder; and
    heating the preform to form a wear-resistant coating;
    wherein the preform is formed by drying a slurry containing a liquid medium, a binder, said braze alloy, and said wear resistant particles to form a green sheet, and sintering the green sheet.

12. The method of claim 11, wherein the wear resistant particles comprise chrome carbide, the chrome carbide being selected from the group consisting of $Cr_{23}C_6$, $Cr_7C_3$, $Cr_3C_2$, and combinations thereof.

13. The method of claim 12, wherein the chrome carbide comprises a pre-alloyed, homogeneous powder.

14. The method of claim 13, wherein the chrome carbide comprises $Cr_{23}C_6$.

15. The method of claim 12, wherein the chrome carbide is blended with a secondary material.

16. The method of claim 15, wherein the chrome carbide comprises $Cr_3C_2$.

17. The method of claim 16, wherein the secondary material comprises nickel chromide.

18. The method of claim 11, wherein the wear-resistant particles comprise a ceramic material.

19. The method of claim 18, wherein the ceramic material comprises chrome carbide.

20. The method of claim 11, wherein the wear-resistant particles comprise an alloy.

21. The method of claim 20, wherein the alloy comprises a cobalt-base alloy capable of forming a lubricious oxide film.

22. The method of claim 11, wherein the braze alloy comprises a nickel-base or a cobalt-base braze alloy, nickel or cobalt being the single greatest element of the braze alloy by weight.

23. The method of claim 11, wherein the substrate is a component of a turbine engine.

24. The method of claim 11, further comprising a step of applying a diffusion coating on the substrate.

25. The method of claim 24, wherein the diffusion coating is formed by depositing aluminum on the wear coating and heating the substrate, whereby the aluminum is diffused into the substrate and forms aluminide intermetallics.

26. A method for coating a turbine engine component, comprising the steps of:
    providing a substrate, the substrate being selected from the group consisting of a nozzle, shroud, shroud hanger, pressure balance seal, and combustor component;
    applying braze alloy and wear-resistant particles on the substrate, the braze alloy comprising a nickel-base or a cobalt-base alloy, wherein nickel or cobalt is the single greatest element of the alloy by weight, and the wear-resistant particles comprising a cobalt alloy wherein the braze alloy and wear-resistant particles are applied to the substrate in the form of a brazing sheet, said brazing sheet comprising at least one green braze tape; and
    heating the braze alloy to bond the wear-resistant particles to the substrate to form a wear coating on the substrate.

27. A method for coating a turbine engine component, comprising the steps of:

providing a substrate, the substrate being selected from the group consisting of a nozzle, shroud, shroud hanger, pressure balance seal, and combustor component;

attaching a preform to the substrate, the preform containing braze alloy and wear-resistant particles and being free of binder, the braze alloy comprising a nickel-base or a cobalt-base alloy, wherein nickel or cobalt is the single greatest element of the alloy by weight, and the wear-resistant particles comprising a material from the group consisting of (i) $Cr_{23}C_6$, $Cr_7C_3$, $Cr_3C_2$, and combinations thereof, and (ii) a cobalt alloy; and heating the preform to form a wear-resistant coating; wherein the preform is formed by drying a slurry containing a liquid medium, a binder, said braze alloy, and said wear resistant particles to form a green sheet, and sintering the green sheet.

* * * * *